US006455771B1

United States Patent
Han et al.

(10) Patent No.: US 6,455,771 B1
(45) Date of Patent: Sep. 24, 2002

(54) SEMICONDUCTING SHIELD COMPOSITIONS

(75) Inventors: Suh Joon Han, Branchburg; Wei-Kuo Lee, Bridgewater, both of NJ (US)

(73) Assignee: Union Carbide Chemicals & Plastics Technology Corporation, Danburry, CT (US)

( * ) Notice: Subject to any disclaimer, the term of this patent is extended or adjusted under 35 U.S.C. 154(b) by 41 days.

(21) Appl. No.: 09/801,976

(22) Filed: Mar. 8, 2001

(51) Int. Cl.[7] .................................................. H05K 9/00
(52) U.S. Cl. ............................. 174/35 MS; 174/126.2; 174/106 R; 525/50
(58) Field of Search .......................... 174/35 MS, 68.1, 174/102 R, 103, 106 R, 126.2; 106/901; 252/182.11, 182.13; 525/50

(56) References Cited

U.S. PATENT DOCUMENTS

| | | | | | |
|---|---|---|---|---|---|
| 4,514,620 | A | * | 4/1985 | Cheng et al. | 219/553 |
| 4,929,388 | A | * | 5/1990 | Wessling | 252/500 |
| 5,143,649 | A | * | 9/1992 | Blackledge et al. | 252/511 |
| 5,371,134 | A | * | 12/1994 | Inoue | 524/495 |
| 5,556,697 | A | * | 9/1996 | Flenniken | 428/323 |
| 5,580,493 | A | * | 12/1996 | Chu et al. | 252/511 |
| 5,889,117 | A | | 3/1999 | Flenniken | 525/222 |
| 6,277,303 | B1 | * | 8/2001 | Foulger | 252/500 |

FOREIGN PATENT DOCUMENTS

| WO | WO00/24816 | 5/2000 |
|---|---|---|

* cited by examiner

Primary Examiner—Dean A. Reichard
Assistant Examiner—W. David Walkenhorst

(57) ABSTRACT

A conducting polymer composite including:

(i) a phase I material consisting essentially of a polar copolymer of ethylene and an unsaturated ester having 4 to 20 carbon atoms, said copolymer having a crystallinity of 0 to about 30 percent as determined by differential scanning calorimetry analysis and having a melt viscosity $\eta_I$;

(ii) a phase II material having a crystallinity of 0 to about 30 percent as determined by differential scanning calorimetry analysis and having a melt viscosity $\eta_{II}$, said phase II material consisting essentially of (A) a non-polar copolymer of ethylene, an alpha-olefin having 3 to 12 carbon atoms, and, optionally, a diene, or (B) a non-polar elastomer, either of which, when mixed with the phase I material, will not enter into a completely homogeneous state, but is compatible with the phase I material; and (iii) a conducting filler material dispersed in the phase I material and/or the phase II in an amount sufficient to be equal to or greater than the amount required to generate a continuous conducting network in the phase I and phase II materials, with the proviso that the phase I and phase II materials, in the molten state, have the following relationship: $(\eta_I \div \eta_{II}) \times (V_{II} \div V_I) =$ about 0.5 to about 2.0, wherein $V_I$ and $V_{II}$ are the volume fractions of the phase I and phase II materials, respectively, and $V_I + V_{II} = 1$.

10 Claims, No Drawings

SEMICONDUCTING SHIELD COMPOSITIONS

TECHNICAL FIELD

This invention relates to semiconducting shield compositions for use in power cable, particularly medium and high voltage power cable.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. The outer semiconducting shield can be either bonded to the insulation or strippable, with most applications using strippable shields. Additional layers within this construction such as moisture impervious materials are often incorporated.

Polymeric semiconducting shields have been utilized in multilayered power cable construction for many decades. Generally, they are used to fabricate solid dielectric power cables rated for voltages greater than 1 kilo Volt (kV). These shields are used to provide layers of intermediate conductivity between the high potential conductor and the primary insulation, and between the primary insulation and the ground or neutral potential. The volume resistivity of these semiconducting materials is typically in the range of $10^{-1}$ to $10^8$ ohm-cm when measured on a completed power cable construction using the methods described in ICEA S-66-524, section 6.12, or IEC 60502-2 (1997), Annex C. Typical strippable shield compositions contain a polyolefin, such as ethylene/vinyl acetate copolymer with a high vinyl acetate content, conductive carbon black, an organic peroxide crosslinking agent, and other conventional additives such as a nitrile rubber, which functions as a strip force reduction aid, processing aids, and antioxidants. These compositions are usually prepared in granular or pellet form. Polyolefin formulations such as these are disclosed in U.S. Pat. No. 4,286,023 and European Patent Application 420 271. The shield composition is, typically, introduced into an extruder where it is co-extruded around an electrical conductor at a temperature lower than the decomposition temperature of the organic peroxide to form a cable. The cable is then exposed to higher temperatures at which the organic peroxide decomposes to provide free radicals, which crosslink the polymer.

In order to provide a semiconducting shield it is necessary, as noted above, to incorporate conductive particles (conductive filler) into the composition. Industry is constantly attempting to reduce the conductive filler loading and thus reduce formulation cost while maintaining a sufficient level of electrical conductivity and improve processability through reduced viscosity.

DISCLOSURE OF THE INVENTION

An object of this invention, therefore, is to provide a multiphase semiconducting shield composition with reduced conductive filler loading while maintaining a high level of conductivity and improving processability. Other objects and advantages will become apparent hereinafter.

According to the invention, such a composition has been discovered. The semiconducting shield composition is a conducting polymer composite comprising:

(i) a phase I material consisting essentially of a polar copolymer of ethylene and an unsaturated ester having 4 to 20 carbon atoms, said copolymer having a crystallinity of 0 to about 30 percent as determined by differential scanning calorimetry analysis and having a melt viscosity $\eta_I$;

(ii) a phase II material having a crystallinity of 0 to about 30 percent as determined by differential scanning calorimetry analysis and having a melt viscosity $\eta_{II}$, said phase II material consisting essentially of (A) a non-polar copolymer of ethylene, an alpha-olefin having 3 to 12 carbon atoms, and, optionally, a diene, or (B) a non-polar elastomer, either of which, when mixed with the phase I material, will not enter into a completely homogeneous state, but is compatible with the phase I material; and (iii) a conducting filler material dispersed in the phase I material and/or the phase II in an amount sufficient to be equal to or greater than the amount required to generate a continuous conducting network in the phase I and phase II materials, with the proviso that the phase I and phase II materials, in the molten state, have the following relationship: $(\eta_I \div \eta_{II}) \times (V_{II} \div V_I)$=about 0.5 to about 2.0 wherein $V_I$ and $V_{II}$ are the volume fractions of the phase I and phase II materials, respectively, and $V_I + V_{II} = 1$.

DESCRIPTION OF THE PREFERRED EMBODIMENTS(S)

The phase I material consists essentially of a polar copolymer of ethylene and an unsaturated ester. The copolymers of ethylene and unsaturated esters are generally made by high pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. In semiconducting shields, the portion of the copolymer attributed to the ester comonomer can be in the range of about 20 to about 55 percent by weight based on the weight of the copolymer, and is preferably in the range of about 35 to about 55 percent by weight. In terms of mole percent, the ester comonomer can be present in an amount of about 5 to about 30 mole percent. The ester can have about 4 to about 20 carbon atoms, and preferably has about 4 to about 7 carbon atoms. Examples of vinyl esters (or carboxylates) are vinyl acetate, vinyl butyrate, vinyl pivalate, vinyl neononanoate, vinyl neodecanoate, and vinyl 2-ethylhexanoate. Vinyl acetate is preferred. Examples of acrylic and methacrylic acid esters are lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. The alkyl group can be substituted with an oxyalkyltrialkoxysilane, for example. The copolymers can have a density in the range of 0.900 to 0.990 gram per cubic centimeter, and preferably have a density in the range of 0.920 to 0.970 gram per cubic centimeter. The copolymers can also have a melt index in the range of about 0.1 to about 100 grams per 10 minutes, and preferably have a melt index in the range of about 1 to about 50 grams per 10 minutes. A typical process for the preparation of a copolymer of ethylene and an unsaturated ester is described in U.S. Pat. No. 3,334,081.

The phase II material consists essentially of a non-polar copolymer ethylene and a minor proportion of one or more alpha-olefins having 3 to 12 carbon atoms, and preferably 4 to 8 carbon atoms, and, optionally, a diene. Examples of the alpha-olefins are propylene, 1-butene, 1-hexene, 4-methyl-1-pentene, and 1-octene. The alpha-olefin comonomers can be present in the copolymer in amounts of about 5 to about 30 mole percent.

The phase II material can also be a non-polar elastomer of which the following are examples:

A copolymer of ethylene and styrene containing about 5 to about 50 mole percent styrene (preferred) or about 20 to about 80 percent by weight based on the weight of the copolymer. This copolymer can be made in a solution process with a single site metallocene catalyst. The details of the synthesis can be found in U.S. Pat. No. 5,703,187; polyisobutylene; IR (polyisoprene); BR (polybutadiene); SBR (polymer of butadiene copolymerized with styrene) also known as styrene-butadiene rubber; Butyl (polymer of isobutylene copolymerized with isoprene); EPM (polymer of ethylene copolymerized with propylene); EPDM (polymer of ethylene copolymerized with propylene and a diene such as hexadiene, dicyclopentadiene, or ethylidene norbornene); Neoprene (polychloroprene); Silicone (polydimethyl siloxane); Copolymers of ethylene and vinyltrimethoxy silane; Copolymers of butadiene and isoprene; Polystyrene; Terpolymers of styrene, butadiene, and isoprene; Chlorobutyl (chlorinated copolymer of isobutylene and isoprene); Bromobutyl (brominated copolymer of isobutylene and isoprene); Brominated copolymer of isobutylene and paramethylstyrene The phase I material can be present in the composite (composition) in an amount of about 10 to about 80 percent by weight based on the weight of the composite, and is preferably present in an amount of about 20 to about 60 percent by weight. The phase II material can be present in the composite in an amount of about 10 to about 80 percent by weight based on the weight of the composite, and is preferably present in an amount of about 20 to about 60 percent by weight.

In a phase separated polymer blend system, the morphological arrangement of the phase domain can be varied from simple droplet domains to co-continuous structures. In general, the larger volume phase tends to be more continuous in space, and the lower viscosity phase tends to be more continuous in space. Phase inversion is a phenomenon in which the more continuous phase becomes the less continuous phase. The phase inversion point in the polymer blend is the condition where the phase of each component, in the molten state coexists as a continuous phase. This can be postulated as $(\eta_I \div \eta_{II}) \times (V_{II} \div V_I)$=about 0.5 to about 2.0, preferably about 1, wherein $V_I$ and $V_{II}$ are the volume fractions of the phase I and phase II materials, respectively, and $V_I + V_{II} = 1$. This postulation can be referred to as the dual phase continuity principle.

It is found that the phase I and phase II materials become compatible in combination even though they are, respectively, polar and non-polar materials. The two materials do not, however, become miscible. Rather, they simply do not enter into a completely homogeneous state.

As the phase I and phase II materials, i.e., polymers, are mixed together in the melt state, the polymers separate and form into distinct phases. Phase separation may be due to incomplete miscibility between two polymer melts or it may be caused by different crystallization from each component, or from both factors simultaneously. As carbon black is compounded into polymer blends to make a conductive polymer blend composite, the carbon black aggregates form a tunneling network. To promote a high level of carbon black aggregate network in the formulation, it is preferable for the hosting polymer that the carbon black be continuous in terms of phase morphology.

The composite of the invention utilizes a polymer fluid mechanic principle for phase dispersion, and phase continuity in the blended system to optimize the hosting condition for carbon black distribution in one step mixing. In the stratified two phases of the polymer melt, the larger volume phase, or low viscosity phase, tends to be more continuous in the resulting polymer blend.

For example, in a metallocene catalyzed linear low-density polyethylene (mLLDPE)/ethylene ethyl-acrylate (EEA) polymer blend formulation, the melt viscosity ratio and volume ratio of the polymers are carefully matched to result in a co-continuous structure. The polarity difference between mLLDPE and EEA induces the acetylene black to segregate preferentially in one phase over the other. This reduces the required concentration of carbon black to meet the volume resistivity requirement, while improving processability at a lower formulation cost.

Optionally, additional phases of other polymeric materials can be introduced into the composite provided that they have properties corresponding to the properties of either the phase I material or the phase II material.

The phase morphology of the polymer blends can be explained qualitatively by considering the distribution of phase in a stratified two phase flow of polymer melts. The level of dispersion in incompatible polymer melts can vary depending on the nature of the polymer pair and deformation. In general, polymer pairs with similar viscosity and chemical character are known to blend easily. The former is based on the hydrodynamic stability standpoint that the efficiency to have an immiscible droplet deformed and break-up into a matrix phase would be the highest with the viscosity ratio between the two phases around unity.

The critical Weber number, which is a measure of the effort required to break up a droplet, for both shearing and extensional flow fields, is at a minimum at the viscosity ratio of about 1. The mixing requirement is much lower in an extensional flow field (such as the one in a Buss™ co-kneader) than that in a shearing field (in a conventional single screw extruder). It is also known that the extended droplets in the shear field break up into smaller droplets when the viscosity ratio of the two components is of the order of unity, but less than 4. However, the volume ratio is also another major factor for the distributive and dispersive mixing of two polymers.

The non-polar ethylene copolymer is preferably a homogeneous copolymer having a polydispersity (Mw/Mn) in the range of about 1.5 to about 3.5 and an essentially uniform comonomer distribution made with a metallocene catalyst sytem. It is characterized by single and relatively low DSC melting points. Mw is defined as weight average molecular weight and Mn is defined as number average molecular weight. The copolymers can also be heterogeneous having an Mw/Mn above 3.5. The non-polar ethylene copolymers can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

These polyethylenes are generally produced by low pressure processes. They can be produced in the gas phase, e.g., in a fluidized bed, or the liquid phase in solutions or slurries by conventional techniques. Low pressure processes are typically run at pressures below 1000 psi (pounds per square inch). The polyethylenes can be produced using various transition metal catalysts. Typical transition metal catalyst systems, which can be used to prepare the blend, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; a chromium based catalyst system such as that described in U.S. Pat. No. 4,101,445; and a metallocene catalyst system such as those described in U.S. Pat. Nos. 4,937,299; 5,317,036; and 5,527,752. Many of these catalyst systems are often referred to as Ziegler-Natta catalyst systems. Catalyst systems, which use chromium or molybdenum oxides on silica-alumina supports, are also useful. As noted above, preferred catalyst systems for preparing the polyehtylene are metallocene catalyst systems. Typical processes for preparing the polyethylenes are also described in the aforementioned patents. The various polyethylenes can include linear low density polyethylenes (LLDPEs), very low density polyethylenes (VLDPEs), medium density polyethylenes (MDPEs), and high density polyethylene (HDPE) having a density greater than 0.940 gram per cubic centimeter.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. The melt index of the VLDPE can be in the range of about 0.1 to about 100 grams per 10 minutes and is preferably in the range of about 1 to about 50 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 0.1 to about 100 grams per 10 minutes, and is preferably in the range of about 1 to about 50 grams per 10 minutes. The alpha-olefins can be the same as those mentioned above. The metallocene catalysts and processes are also the same subject to variations necessary to obtain the desired densities and melt indices.

The polymers can be made moisture curable by making the resin hydrolyzable, which is accomplished by adding hydrolyzable groups such as —Si(OR)$_3$ wherein R is a hydrocarbyl radical to the resin structure through copolymerization or grafting. Suitable grafting agents are organic peroxides such as dicumyl peroxide; 2,5-dimethyl-2,5-di(t-butylperoxy)hexane; t-butyl cumyl peroxide; and 2,5-dimethyl-2,5-di(t-butylperoxy)hexane-3. Dicumyl peroxide is preferred. Hydrolyzable groups can be added, for example, by copolymerizing ethylene with an ethylenically unsaturated compound having one or more —Si(OR)$_3$ groups such as vinyltrimethoxysilane, vinyltriethoxysilane, and gamma-methacryloxypropyltrimethoxy-silane or grafting these silane compounds to the resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred. Examples of hydrolyzable copolymers and hydrolyzable grafted copolymers are ethylene/vinyltrimethoxy silane copolymer, ethylene/gamma-methacryloxypropyltrimethoxy silane copolymer, vinyltrimethoxy silane grafted ethylene/ethyl acrylate copolymer, vinyltrimethoxy silane grafted linear low density ethylene/1-butene copolymer, and vinyltrimethoxy silane grafted low density polyethylene.

In applications where moisture cured insulation is used, it is desirable to provide a moisture cured strippable semiconducting shield to protect the insulation. The shield composition would then be prepared in the same manner as the moisture cured insulation as outlined above.

The conducting filler material (conductive particles) can be a conventional conductive carbon black commonly used in semiconducting shields. These conductive particles have been generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon blacks can be used in the semiconducting shield composition in an amount of about 10 to about 50 percent by weight based on the weight of the composition, and are preferably used in an amount of about 15 to about 45 percent by weight. This can be referred to as conductive filler loading. Both standard conductivity and high conductivity carbon blacks can be used with standard conductivity blacks being preferred. Examples of conductive carbon blacks are the grades described by ASTM N550, N472, N351, N110, Ketjen blacks, furnace blacks, and acetylene blacks. Carbon nanotubes can also be used as described in patent application Ser. No. 09/311,480 filed on May 13, 1999. Conductive fillers other than carbon black or carbon nanotubes can also be used. Examples are metallic particles, fullerenes, and conductive polymers such as polyacetylene, polyparaphenylene, polypyrrole, polythiophene, and polyaniline.

Optionally, a copolymer of acrylonitrile and butadiene wherein the acrylonitrile is present in an amount of about 20 to about 60 percent by weight based on the weight of the copolymer, and is preferably present in an amount of about 30 to about 40 percent by weight, can be included in the semiconducting shield composition. This copolymer is usually used in an insulation shield rather than the conductor or strand shield, which is the preferred use of the composite of this invention. The copolymer is also known as a nitrile rubber or an acrylonitrile/butadiene copolymer rubber. The density can be, for example, 0.98 gram per cubic centimeter and the Mooney Viscosity can be (ML 1+4) 50. A silicone rubber can be substituted for the nitrile rubber, if desired.

The phase I and phase II materials can be crosslinked. This is accomplished in a conventional manner with an organic peroxide or irradiation, the former being preferred. The amount of organic peroxide used can be in the range of about 0.3 to about 5 percent, and is preferably in the range of about 0.5 to about 3 percent by weight, based on the weight of the composite. Organic peroxide crosslinking temperatures can be in the range of about 125 to about 250 degrees C. and are preferably in the range of about 135 to about 210 degrees C.

Examples of organic peroxides useful in crosslinking are dicumyl peroxide; t-butyl cumyl,peroxide; lauroyl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2,5-dimethyl-2,5-di(t-butyl-peroxy)hexane; tertiary butyl hydroperoxide; isopropyl percarbonate; and alpha,alpha'-bis(tertiary-butylperoxy) diisopropylbenzene.

Irradiation is typically effected by electron beam. The composition in pellet form is subjected to an electron beam at a given dose rate or exposed to a Gamma source of specific strength for a given period of time to impart a specific dose rate of radiation.

Conventional additives, which can be introduced into the composition, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than about 0.1 to more than about 50 percent by weight (the higher amounts are generally for fillers) based on the weight of the composite.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha,alpha-demthylbenzyl) diphenylamine, and alkylated diphenylamines. Antioxidants can be used in amounts of about 0.1 to about 5 percent by weight based on the weight of the composite.

Compounding can be effected in a conventional melt/mixer or in a conventional extruder, preferably in one step, and the terms melt/mixer and extruder are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. The semiconducting shield composition of the invention can be prepared in various types of melt/mixers and extruders such as a Brabender™ mixer, Banbury™ mixer, a roll mill, a BUSS™ co-kneader, a biaxial screw kneading extruder, and single or twin screw extruders. A description of a conventional extruder can be found in U.S. Pat. No. 4,857,600. In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 120° C. to about 260° C., and preferably in the range of about 140° C. to about 220° C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

The advantages of the invention are as follows: Volume resistivity (VR) is well below the AEIC (Association of Edison Illuminating Companies) specifications and stable under heat aging condition; a much lower VR percolation limit is exhibited indicating selective segregation of carbon black in the system; a VR rise is suppressed near melting transition providing more uniform VR behavior over the temperature range of 25 to 150 degrees C.; the concept of selective segregation of carbon black is as effective with the lower cost furnace black as opposed to the higher cost acetylene black; a high degrees of surface smoothness is exhibited, which yields a more ideal interface between the shield and the insulation; cure and mechanical properties are improved over conventional smooth surface formulations; carbon black content is reduced with attendant improved processability and lower cost; less carbon black is needed to obtain the same conductivity as conventional shields; good balance of cure and scorch retardancy; and tougher and more ductile than conventional shields.

The term "surrounded" as it applies to a substrate being surrounded by an insulating composition, jacketing material, semiconducting shield, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above. The conductors can be electrical such as copper or communications media such as fiber optics made up of glass fibers.

All molecular weights mentioned in this specification are weight average molecular weights unless otherwise designated.

The patents mentioned in this specification are incorporated by reference herein.

The invention is illustrated by the following examples:

EXAMPLES

The polymers used in the examples are described as follows:

PE I is a copolymer of ethylene and ethyl acrylate manufactured by a free radical polymerization in a tubular high pressure reactor. The high MFR indicates a broad molecular weight distribution.

PE II is a copolymer of ethylene and 1-octene prepared by a solution process with a single site metallocene catalyst. The polydispersity is about 2.0.

PE III is also a copolymer of ethylene and 1-octene prepared by a solution process with a single site metallocene catalyst. The polydispersity is about 2.0.

Key characteristics of PE II and PE III are the narrow molecular weight and comonomer distribution.

Other characteristics of these resins are set forth in Table I.

TABLE I

|  | PE I | PE II | PE III |
|---|---|---|---|
| Comonomer | ethyl acrylate | 1-octene | 1-octene |
| Comonomer weight (% by wt of copolymer) | 19 | 19* | 20* |
| Density, g/cm$^3$ | 0.937 | 0.887 | 0.881 |
| $T_m$ (° C.) (shoulder peak) | 95.9 (80) | 72 (59) | 76 (57) |
| $T_c$ (° C.) | 75 | 55 | 54 |
| $\Delta H_m$ (J/g) | 66 | 40.4 | 43.5 |
| Degree of crystallinity, % | 23 | 14 | 15 |
| MI | 16.7 | 10.2 | 17.5 |
| MFR | 44.9 | 30.2 | 28.4 |

*estimated from melting point depression
Notes to Tables:

TABLE I-continued

|  | PE I | PE II | PE III |
|---|---|---|---|

1. $T_m$ (° C.) (shoulder peak) = major melting point and, in parentheses, minor melting transition point, all in degrees C.
2. $T_c$ (° C.) = crystallization temperature in degrees C.
3. $\Delta H_m$ (J/g) = heat of melting in Joules per gram.
4. MI = melt index determined under ASTM D 1238 at 2.16 kilograms and 190 degrees C.
5. MFR = melt flow ratio, which is the ratio of flow index to melt index. Flow index is determined under ASTM D 1238 at 21.6 kilograms and 190 degrees C.

The apparent shear viscosity of the polymers is determined with a GöTFERT™ capillary rheometer (model 2001) between 125 and 180 degrees C. The polymers are sheared through a capillary (L/D=20/1 millimeters) at shear rates of 18 to 3600 s$^{-1}$. The pressure drop is monitored by a 1000 bar transducer. No end correction is applied to these tests. Apparent shear viscosity of PE I at the shear rate of 360 1/s is lower than that of PE II and PE III. This is due to a broader molecular weight distribution and the presence of long chain branching in PE I. PE II exhibits a higher apparent shear viscosity than PE III because of a higher molecular weight.

Two carbon blacks, Denka ™ acetylene black and Cabot Vulcan™ furnace black are used for the semiconducting formulations. They will be referred to as CB I and CBII, respectively.

A BUSS™ 140 millimeter 11D co-kneader is utilized to achieve a high dispersion of CB I in the polymers. The carbon black concentration is adjusted by controlling the conveyer feed rates of polymer and carbon black after pyrolytic carbon black analysis. The formulations are shown in Table II.

The CB I is also formulated with the polymers in a Brabender™ mixer to test the volume resistivity. Mixing takes place at 150 degrees C. and 50 rpm for 20 minutes. The formulations are shown in Table III.

Values are in weight percent based on the weight of the composition.

TABLE II

|  | Examples | | | | | | | |
|---|---|---|---|---|---|---|---|---|
|  | 1 | 2 | 3 | 4 | 5 | 6 | 7 | 8 |
| PE I | 60 |  |  |  |  | 64 |  |  |
| PE II |  | 60 |  |  |  |  |  |  |
| PE III |  |  | 60 |  |  |  |  |  |
| PE I/PE II blend |  |  |  | 60 |  |  |  | 64 |
| PE I/PE III blend |  |  |  |  | 60 |  | 64 |  |
| CB I | 38 | 38 | 38 | 38 | 38 | 34 | 34 | 34 |
| PEG | 1 | 1 | 1 | 1 | 1 | 1 | 1 | 1 |
| AgeRite MA | 1 | 1 | 1 | 1 | 1 | 1 | 1 | 1 |
| Total sum | 100 | 100 | 100 | 100 | 100 | 100 | 100 | 100 |
| Intermediate | 98.7 | 98.7 | 98.7 | 98.7 | 98.7 | 98.7 | 98.7 | 98.7 |
| Dicumyl peroxide | 1.3 | 1.3 | 1.3 | 1.3 | 1.3 | 1.3 | 1.3 | 1.3 |

TABLE III

| | Examples | | | | | | | | | | | | | | |
|---|---|---|---|---|---|---|---|---|---|---|---|---|---|---|---|
| | 9 | 10 | 11 | 12 | 13 | 14 | 15 | 16 | 17 | 18 | 19 | 20 | 21 | 22 | 23 |
| PE I | 61 | 63 | 66 | 69 | 72 | 26 | 23 | 27 | 24.1 | 28.6 | 25.2 | 29.4 | 26 | 28.1 | 24.9 |
| PE II | | | | | | | 38 | | 39.9 | | | | 43 | | 41.1 |
| PE III | | | | | | 35 | | | | 38.4 | 41.8 | 39.6 | | 37.9 | |
| CB I | 38 | 35 | 32 | 29 | 26 | 38 | 38 | 35 | 35 | 32 | 32 | 29 | 29 | 26 | 26 |
| PEG | | 1 | 1 | 1 | 1 | | | | | | | 1 | 1 | 1 | 1 |
| AgeRite MA | 1 | 1 | 1 | 1 | 1 | 1 | 1 | 1 | 1 | 1 | 1 | 1 | 1 | 1 | 1 |
| Total sum | 100 | 100 | 100 | 100 | 100 | 100 | 100 | 100 | 100 | 100 | 100 | 100 | 100 | 100 | 100 |
| Intermediate | 98.7 | 98.9 | 98.9 | 98.9 | 98.9 | 98.7 | 98.7 | 98.7 | 98.7 | 98.7 | 98.7 | 98.7 | 98.7 | 98.7 | 98.7 |
| Dicumyl peroxide | 1.3 | 1.1 | 1.1 | 1.1 | 1.1 | 1.3 | 1.3 | 1.3 | 1.3 | 1.3 | 1.3 | 1.3 | 1.3 | 1.3 | 1.3 |

Notes to Tables:
6. PEG = polyethylene glycol having a molecular weight of 20,000.
7. Agerite MA = polymerized 1,2-dihydro-2,2,4 trimethyl quinoline
8. Intermediate = the formulation without the organic peroxide.

Carbon black is elemental carbon in the form of spheroidal colloidal particles and coalesced particle aggregates, manufactured by the thermal decomposition of hydrocarbons. Although the carbon black has less order than graphite, carbon black microstructure is graphitic in nature. One of key characteristics of carbon black is the high degree of porosity and hollowing at the core of the carbon black particle. Carbon blacks are known as intrinsic semiconductors.

When carbon black is added into a polymer matrix to a certain level, the carbon black aggregates form a continuous path and become a conductive polymer composite. In the electron tunneling theory, electron flow occurs when the carbon black aggregates are in contact or separated by less than a critical distance, or percolation distance, which has been suggested to be about 100 Angstroms or less. In a sense, electrons tunnel through the resistive polymer from aggregate to aggregate. As the aggregates are increasingly more in contact or close enough for tunneling to occur, the electrical conductivity of the polymer composite increases. Percolation is the point where the polymer composite makes a transition from insulating to conducting system. However, processability of the polymer formulation must also be considered to balance overall performance of the product in power cables. As the carbon black content decreases, it is easier to extrude.

In PE I/PE II or PE I/PE III polymer blend formulations, the melt viscosity ratio and volume ratio of the polymers are carefully matched to result in co-continuous structures. The polarity difference between PE II or PE III and PE I will drive CB I to segregate preferentially in one phase over the other. This reduces the required concentration of carbon black to meet the volume resistivity requirement while improving processability at a lower formulation cost.

In all of the blends, it is found that the phase I and phase II materials become compatible, but do not enter into a completely homogeneous state, and that the carbon black does generate a continuous conducting network in the phase I and phase II materials. It is further found that the phase I and phase II materials, in the molten state, have the following relationship: $(\eta_I \div \eta_{II}) \times (V_{II} \div V_I) =$ about 1 wherein $V_I$ and $V_{II}$ are the volume fractions of the phase I and phase II materials, respectively, and $V_I + V_{II} = 1$.

Heat aging volume resistivity (VR) tests on mini-cables at 90 degrees C. and 130 degrees C. are evaluated on the Table II formulations. During 1 week of aging at 90 degrees C., the VR of these formulations is stable at 700 to 2400 ohm-centimeters, and below the AEIC specification of $10^5$ ohm-centimeters. VR at 90 degrees C. in formulations having 34 percent by weight CB I is about 900 to 1500 ohm-centimeters whereas the VR of example 1 is 2500 ohm-centimeters with 38 percent by weight CB I and the VR of example 6 is 9700 ohm-centimeters with 34 percent by weight CB I.

The Table III formulations are prepared with lower CB I content and extruded over mini-cables having conventional insulation comprising a homopolymer of ethylene prepared by a high pressure process and an antioxidant, for VR study under heat aging conditions.

It is found that the VR of the PE I formulations, which contain a single polymer component, is strongly dependent on the carbon black content, and that the VR increases dramatically as the carbon black content decreases. The carbon black particles are isolated in the system to such extent that the resistance is large at the lower carbon black concentration.

However, it is also found that the VR of the Tables II and III formulations is much less sensitive to the carbon black content. Therefore, these formulations are more conductive even at lower carbon black content. In a sense, the percolation threshold in these formulations is suppressed to a lower carbon black content. This suggests that the segregation of carbon black in the Tables II and III formulations provide a very effective conduction path in the system. As a result, the processability of the formulations can be improved at the lower carbon black content. This conclusion is drawn from mixing the Table III fomulations at 90 and 130 degrees C. and aging for 7 days.

Polymers, which are not prepared with metallocene catalysts, are mixed with PE I and CB II and another additive in a Brabender™ melt/mixer at 150 degrees C. and 30 rpm for 15 minutes.

The blend morphology is found to form a co-continuous network structure on the basis of the dual phase continuity principle. Referring to Table IV, the volume resistivity of the formulation in examples 5 to 8 is an order of magnitude lower than that of the formulations in examples 1 to 4 at 90 degrees C. This suggests a certain degree of segregation of the carbon black in the blend formulations for a higher conductivity.

The formulations are set forth in Table IV. Values are in weight percent.

TABLE IV

| | Examples | | | | | | | |
|---|---|---|---|---|---|---|---|---|
| | 1 | 2 | 3 | 4 | 5 | 6 | 7 | 8 |
| PE IV | 84 | 79 | 74 | 69 | | | | |
| PE V | | | | | 62.4 | 58.7 | 55 | 51.2 |
| PE I | | | | | 21.6 | 20.3 | 19 | 17.8 |
| CB II | 15 | 20 | 25 | 30 | 15 | 20 | 25 | 30 |
| Additive I | 1 | 1 | 1 | 1 | 1 | 1 | 1 | 1 |
| Total sum | 100 | 100 | 100 | 100 | 100 | 100 | 100 | 100 |
| Intermediate | 98.9 | 98.9 | 98.9 | 98.9 | 98.9 | 98.9 | 98.9 | 98.9 |
| Organic peroxide II | 1.1 | 1.1 | 1.1 | 1.1 | 1.1 | 1.1 | 1.1 | 1.1 |

Notes to Tables:
9. PE IV = an ethylene/ethyl acrylate copolymer having 18 percent by weight ethyl acrylate and an MI of 6 grams per 10 minutes. It is prepared with free radical initiators in a high pressure reactor.
10. PE V is a conventional copolymer of ethylene and 1- butene having a density of 0.904 gram per cubic centimeter; an MI of 3.2 grams per 10 minutes; an MFR of 35.4; a $T_m$ (° C.) of 114.7; and a $T_c$ (° C.) of 106. It is prepared with a magnesium/titanium catalyst in a fluidized bed reactor.
11. Additive I = 4,4'-bis(alpha, alpha'-dimethylbenzyl) diphenyl amine.
12. Organic peroxide II = alpha, alpha'-bis(tert-butylperoxy)-diisopropyl benzene.

The temperature dependence of volume resistivity is investigated using the Table II formulations. It is expected that the density of the overall polymer phase will be reduced during melting of the formulations and the carbon black fillers will be locally dis-aggregated and re-aggregated as hydrodynamic conditions permit. As a result, the formulations undergo a transition from conductive to relatively resistive near the melting transition point.

The formulations with single PE I polymers results in the highest VR transition from 1,700 ohm-centimeters at 90 degrees C. to 15,700 ohm-centimeters at 110 degrees C. However, the Table II blend formulations effectively suppress the VR rise near the melting transition point providing a relatively uniform conductivity in the temperature range. It is interesting to note that the formulations in examples 2 and 3 of Table II, which are based on a single base resin, result in a minor VR rise close to 70 degrees C., but still continue to increase VR gradually close to 110 degrees C. similar to example 1. The same trend of VR rise is observed for the formulation with 34 percent by weight carbon black. The example 5 and 8 formulations (Table II) exhibit the most effective VR suppression at 38 and 34 percent by weight carbon black, respectively.

The pelletized Table II formulations are soaked with dicumyl peroxide at 60 degrees C. in a round-bottom flask in which a rotary evaporator and water bath are used to control mixing at constant temperature. The peroxide response is determined by monitoring a torque rise in the Alpha Technologies™ MDR 2000 at 182 degrees C. for 12 minutes. For a scorch resistance test, the MDR torque is monitored at 140 degrees C. for 60 minutes. The Table II formulations containing metallocene catalyzed polymers exhibit a higher MDR MH response than the formulations, which do not contain the metallocene catalyzed polymers, suggesting a higher level of crosslinking. The scorch time for examples 3, 4, and 7 are higher than examples 1, 2, 5, and 8 indicating better scorch retardancy. The example 4, 5, 7, and 8 formulations exhibit a cure and scorch retardancy between the homopolymer formulations.

The elongation at break and ultimate strength are measured at room temperature by an Instron™ Universal Test Instrument using dog-bone shaped samples, which are cured at 185 degrees C. for 25 minutes at 25 tons pressure. The samples are elongated under a 100 pound crosshead at a crosshead rate of 20 inches per minute until they reach a breaking point. The ultimate strength of the metallocene catalyzed polymer formulations is almost same as the formulations, which do not contain a metallocene catalyzed polymer, but the maximum extensibility of metallocene catalyzed polymer formulations is about two times higher than that of the formulations, which do not contain a metallocene catalyzed polymer. As a result, the area under the breaking point in the metallocene catalyzed polymer formulations is increased, suggesting an increase in toughness. Therefore, metallocene catalyzed polymer formulations are more ductile than the the formulations, which do not contain a metallocene catalyzed polymer, and exhibit a ductility between the homopolymer formulations. The ultimate strength and elongation at break are also compared before and after aging at 150 degrees C. for 2 weeks. After aging at 150 degrees C. for 2 weeks, all of the formulations maintain their ultimate strength close to the initial values and retain their ultimate elongation.

The Table II formulations (examples 1 to 5, 7, and 8) are extruded using a CV line over XLPE (crosslinked low density polyethylene) insulation and a strippable insulation shield. The target cable dimension is 0.015/0.175/0.040 inch for conductor shield/insulation/insulation shield on an AWG (American Wire Grade) #2–7 wire aluminum conductor. The pellets from all of the Table II formulations are fed well into the feeding throat of the extruder without significant pellet agglomeration, and the cable transition is very smooth.

As the carbon black content in the Table II formulations containing the metallocene catalyzed polymers decreases, the extruder head-pressure and motor amp decreases. An about 30 percent lower extruder pressure drop is observed with the formulations containing 4 percent less acetylene black (examples 7 and 8). It is clear that the low formulation viscosity due to a lower carbon black content improves the processability in the cable extrusion line insofar as rate and ease of processing is concerned.

One of the major concerns for the Table II formulations containing metallocene catalyzed polymers is the stability of VR under various heat aging conditions, which might be affected by the phase morphology of the formulations. To simulate the effect of thermal fluctuation, the VR of the formulations from the above cable extrusion run is tested under cyclic heat aging conditions at 90 and 130 degrees C. The cable samples are heated for 8 hours at the test temperature, followed by cooling down for 16 hours at room temperature. The procedure is repeated for 42 days. It is found that the VR of the formulations is constant at these conditions. This suggests that the phase structures of the formulations are stable, which could be due to a high level of crosslinking in the formulations.

What is claimed is:

1. A conducting polymer composite comprising:
   (i) a phase I material consisting essentially of a polar copolymer of ethylene and an unsaturated ester having 4 to 20 carbon atoms, said copolymer having a crystallinity of 0 to about 30 percent as determined by differential scanning calorimetry analysis and having a melt viscosity $\eta_I$;
   (ii) a phase II material having a crystallinity of 0 to about 30 percent as determined by differential scanning calorimetry analysis and having a melt viscosity $\eta_{II}$, said phase II material consisting essentially of (A) a non-polar copolymer of ethylene, an alpha-olefin having 3 to 12 carbon atoms, and, optionally, a diene, or (B) a non-polar elastomer, either of which, when mixed with the phase I material, will not enter into a completely homogeneous state, but is compatible with the phase I material; and (iii) a conducting filler material dispersed in the phase I material and/or the phase II material in an amount sufficient to be equal to or greater than the amount required to generate a continuous conducting network in the phase I and phase II materials, with the proviso that the phase I and phase II materials, in the molten state, have the following relationship: $(\eta_I \div \eta_{II}) \times (V_{II} \div V_I) =$ about 0.5 to about 2.0, wherein $V_I$ and $V_{II}$ are the volume fractions of the phase I and phase II materials, respectively, and $V_I + V_{II} = 1$.

2. The composite defined in claim 1 wherein the components are present in the following amounts based on the weight of the composite:

(i) the phase I material is about 10 to about 80 percent by weight;

(ii) the phase II material is about 10 to about 80 percent by weight; and (iii) the conducting filler material is about 10 to about 50 percent by weight.

3. The composite defined in claim 2 wherein the unsaturated ester is a vinyl ester; an acrylic acid ester; or a methacrylic acid ester and the ester is present in the copolymer in an amount of about 20 to about 55 percent by weight.

4. The composite defined in claim 1 wherein the phase II material is a non-polar elastomer.

5. The composition defined in claim 1 wherein the phase II material is a copolymer of ethylene and an alpha-olefin has 4 to 8 carbon atoms made with a metallocene catalyst.

6. The composition defined in claim 2 wherein the conducting filler material is a furnace black or an acetylene black.

7. A cable comprising one or more electrical conductors or communications media or a core of two or more electrical conductors or communications media, each electrical conductor, communications medium, or core being surrounded by a layer consisting essentially of: a crosslinked conducting polymer composite comprising:

(i) a phase I material consisting essentially of a polar copolymer of ethylene and an unsaturated ester having 4 to 20 carbon atoms, said copolymer having a crystallinity of 0 to about 30 percent as determined by differential scanning calorimetry analysis and having a melt viscosity $\eta_I$;

(ii) a phase II material having a crystallinity of 0 to about 30 percent as determined by differential scanning calorimetry analysis and having a melt viscosity $\eta_{II}$, said phase II material consisting essentially of (A) a non-polar copolymer of ethylene, an alpha-olefin having 3 to 12 carbon atoms, and, optionally, a diene, or (B) a non-polar elastomer, either of which, when mixed with the phase I material, will not enter into a completely homogeneous state, but is compatible with the phase I material; and (iii) a conducting filler material dispersed in the phase I material and/or the phase II material in an amount sufficient to be equal to or greater than the amount required to generate a continuous conducting network in the phase I and phase II materials, with the proviso that the phase I and phase II materials, in the molten state, have the following relationship: $(\eta_I \div \eta_{II}) \times (V_{II} \div V_I) =$ about 0.5 to about 2.0, wherein $V_I$ and $V_{II}$ are the volume fractions of the phase I and phase II materials, respectively, and $V_I + V_I = 1$.

8. The cable defined in claim 7 wherein the unsaturated ester is a vinyl ester, an acrylic acid ester, or a methacrylic acid ester and the ester is present in the copolymer in an amount of about 20 to about 55 percent by weight.

9. The cable defined in claim 7 wherein the phase II material is a non-polar elastomer.

10. The cable defined in claim 7 wherein the phase II material is a copolymer of ethylene and an alpha-olefin has 4 to 8 carbon atoms made with a metallocene catalyst.

* * * * *